United States Patent [19]

Abu-Isa

[11] Patent Number: 4,684,382

[45] Date of Patent: Aug. 4, 1987

[54] EVAPORATIVE FUEL CONTROL CANISTER CONTAINING EPDM FOAM FILTER

[75] Inventor: Ismat A. Abu-Isa, Rochester, Mich.

[73] Assignee: General Motors Corporation, Detroit, Mich.

[21] Appl. No.: 834,536

[22] Filed: Feb. 28, 1986

[51] Int. Cl.[4] .............................................. B01D 50/00

[52] U.S. Cl. ........................................ 55/316; 55/387; 55/522; 55/DIG. 42; 502/402; 123/519

[58] Field of Search ......... 55/316, 387, 522, DIG. 42; 123/519-521; 210/496, 924, 925; 502/402; 521/150

[56] References Cited

U.S. PATENT DOCUMENTS

| | | | |
|---|---|---|---|
| 3,683,597 | 8/1972 | Beveridge et al. | 55/316 |
| 4,181,780 | 1/1980 | Brenner et al. | 521/150 |
| 4,430,099 | 2/1984 | Yanagisawa et al. | 55/387 |

*Primary Examiner*—Bernard Nozick
*Attorney, Agent, or Firm*—Randy W. Tung

[57] ABSTRACT

An evaporative fuel control canister device containing a quantity of fuel-absorbing material which includes EPDM elastomeric foam for improved absorption of both fuel vapor and liquid fuel.

3 Claims, 3 Drawing Figures

EVAPORATIVE FUEL CONTROL CANISTER CONTAINING EPDM FOAM FILTER

FIELD OF THE INVENTION

This invention generally relates to an evaporative fuel control canister device containing a quantity of fuel-absorbing material and, more particularly, is concerned with an evaporative fuel control canister device wherein the fuel-absorbing materials comprise EPDM elastomeric foam.

BACKGROUND OF THE INVENTION

In a vehicle equipped with an internal combustion engine, evaporative fuel control canister type devices are used for controlling loss of fuel vapor from fuel tanks and fuel-dispensing units such as carburetors. A common canister device containing a quantity of fuel-absorbing materials such as activated charcoal is connected to the fuel tank vents and the fuel-dispensing unit vents which stores the fuel vapor emitted therefrom. During vehicle operation, the fuel vapor stored is purged from the fuel-absorbing material back into the engine induction system.

Activated charcoal has been found a suitable fuel vapor absorbing material to be used in such a canister device because of its very large surface area to weight ratio, i.e., the particles of activated charcoal are extremely porous and have a sponge-like structure. This open porous structure while extremely effective in the absorption of fuel vapor can be blocked and loses its efficiency when coated with liquid fuel. This occurs when liquid fuel is accidentally spilled into the fuel vapor inlet of a canister device. The term liquid fuel is used to include liquid gasoline and other high molecular weight hydrocarbons with six or more carbon atoms such as benzene, toluene, heptane, and xylene.

It is therefore an object of the present invention to provide an evaporative fuel vapor control canister device containing a quantity of fuel vapor absorbing material having improved fuel vapor absorbing capability.

It is another object of the present invention to provide an evaporative fuel vapor control canister device containing fuel absorbing materials having not only excellent fuel vapor absorption capability but also excellent liquid fuel absorption capability.

SUMMARY OF THE INVENTION

In accordance with a preferred embodiment of the present invention, an evaporative fuel vapor control canister device can be built which has not only excellent fuel vapor absorption capability but also superior liquid fuel absorption capability. This is achieved by the incorporation of an elastomeric foam filter having unique liquid fuel absorption capability in such a canister device.

We have discovered a unique elastomeric foam material of EPDM (ethylene-propylene-diene-monomer) which has superior absorption property for liquid gasoline and other high molecular weight hydrocarbons. This elastomeric foam material can absorb up to 5 times its own weight of such liquids. When compared with activated charcoal material, this EPDM elastomeric foam absorbs 3 times more liquid gasoline and other high molecular weight hydrocarbons than activated charcoal.

My novel canister device can be used in a system for controlling loss of fuel vapor and liquid fuel from a vehicle equipped with a fuel reservoir and an internal combustion engine having an induction passage. This canister device has a housing which is a cylindrical absorption chamber defined by a cylindrical sidewall and two oppositely positioned end walls. The first end wall contains a fuel vapor inlet and a fuel vapor outlet. The second end wall contains an air inlet to allow the purging through the canister device of fresh atmospheric air. A quantity of suitable fuel-absorbing material such as activated charcoal is used to fill the cylindrical chamber. One or a number of filters made of EPDM elastomeric foam are placed in the absorption chamber adjacent to the fuel-absorbing material and/or the air inlet. To achieve a maximum absorption efficiency, the density of the EPDM elastomeric foam filters is kept under 0.5 gm/cm$^3$.

Fuel vapor escaped from the fuel reservoir and other fuel-dispensing units enters the carbon canister through the fuel vapor inlet located in one of the end walls. The vapor is absorbed by the fuel-absorbing material contained in the canister such as activated charcoal and EPDM elastomeric foam filters. Accidental spills of liquid gasoline and other high molecular weight hydrocarbons into the fuel vapor inlet are absorbed by EPDM elastomeric foam filters placed between the fuel vapor inlet and the activated charcoal to prevent potential contamination of the latter. During vehicle operation, a negative pressure is generated in the canister to draw fresh atmospheric air from the air inlet such that fuel vapor absorbed in the activated charcoal and in the elastomeric foam filter are purged back to the engine induction passage through the fuel vapor outlet.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

Figure 1:
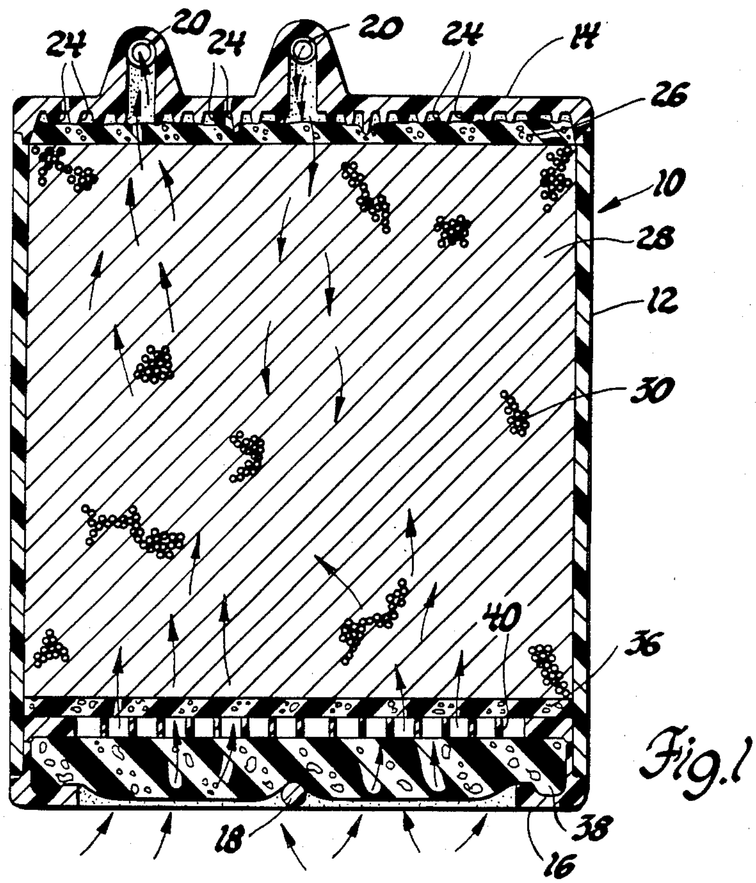
FIG. 1 is an enlarged sectional view of an evaporative fuel vapor control canister in elevation showing the construction of the canister assembly.

Referring initially to FIG. 1 where a sectional view of canister 10 is shown. Canister 10 contains a cylindrical sidewall portion 12 and two oppositely positioned end walls 14 and 16. End wall 16 which is located at the bottom of canister 10 has a hollow center and a built-in cross bar support 18. The cylindrical sidewall portion 12 and the end walls 14 and 16 are injection molded of a high strength and high temperature thermoplastic material such as nylon 66. They are assembled together by using a vibration welding technique. In the end wall piece 14, a fuel inlet port 20 and a fuel vapor outlet port 22 are molded in. A plurality of cavities 24 are also molded in the inner surface of end wall 14 to improve the absorption efficiency of elastomeric foam filter 26 positioned between the fuel inlet and the absorption chamber 28.

The composition of my EPDM elastomer foam is shown in Table 1. I used an EPDM elastomer having a Mooney viscosity number of 45±5 at 260° F. which is commercially available from Exxon under the tradename of Vistalon® 6505. According to the manufacturer, this EPDM elastomer contains 9 wt % ethylene norbornene as the diene component, 53 wt % of ethylene, and 38 wt % of propylene.

TABLE 1

Composition of EPDM Elastomeric Foam

| Ingredients | Concentration Phr by Weight |
|---|---|
| EPDM rubber | 100 |
| Sulfonic Acid and Paraffinic Oil Blend | 5 |
| Paraffinic Oil | 15 |
| Stearic Acid | 5 |
| Zinc Oxide | 5 |
| Sodium Bicarbonate | 15 |
| Sulfur | .5 |
| Tetramethylthiuram Disulfide | .5 |
| 2-Mercaptobenzothiazole | .5 |

The EPDM rubber and other ingredients are mixed in a two-roll mill cooled by circulating tap water. After mixing, the compound is molded between two aluminum foils using a 152×152 mm steel mold with a 1.9 mm spacer. I have found that for each 1.9 mm rubber slab molded, approximately 45 gms of compound is needed. The compression molding is performed at 60° C. for 5 minutes under 1000 psi pressure.

After rubber slabs are molded, they are placed in an air-circulating oven at 180° C. for 10 minutes. The rubber slabs are foamed and cured during this period of time. I have estimated that the crosslinking density achieved in the elastomeric foam is $40\times10^{-6}$ mole/cm$^3$ which corresponds to a molecular weight between crosslinks of 22,000. I have also found that in order to achieve maximum absorption efficiency, the bulk density of the EPDM foam should be kept under 0.5 gm/cm$^3$, preferably in the range of 0.2 to 0.4 gm/cm$^3$. The cell sizes were determined to be 0.375 mm to 1.25 mm diameter with the average cell size being 0.8 mm diameter.

At the bottom of canister 10, EPDM elastomeric foam filters 36 and 38 are supported by a support grid 40 and a bottom end wall 16. Filters 36 and 38 function not only as fuel absorbent to absorb fuel vapor and liquid fuel but also as dust filters to allow clean atmospheric air to purge through the canister. This fresh atmospheric air carries fuel vapor desorbed from foam filters 26, 36 and 38 and activated charcoal 30 through the fuel vapor outlet 22 into the engine induction chamber (not shown) during vehicle operations when a negative pressure is generated in the canister.

It is to be noted that even though three EPDM elastomeric foam filters are shown in our preferred embodiment, any combination of EPDM foam filters may be used in an evaporative fuel vapor control device to assist in the absorption of fuel vapor and to absorb liquid fuel. I have found that EPDM elastomeric foam filter is capable of absorbing up to 5 times its own weight of liquid fuel. This unique absorption capability of liquid fuel prevents the coating of activated charcoal by liquid gasoline and other high molecular weight hydrocarbons when the same is accidentally overflowed or spilled into the canister.

Figure 2:
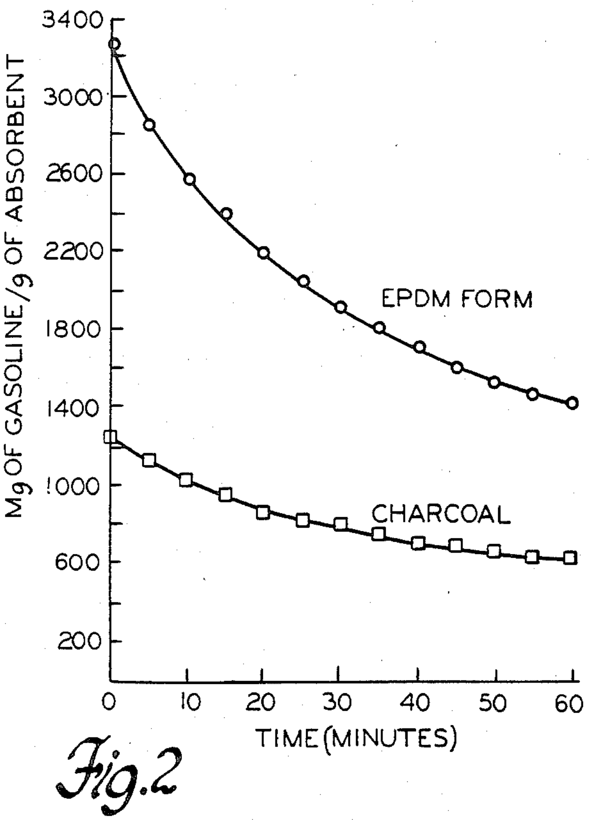
FIG. 2 is a graph showing the desorption of liquid fuel from EPDM elastomeric foam and from activated charcoal.

FIG. 2 is a graph showing desorption curves of liquid gasoline from EPDM elastomeric foam and from activated charcoal. It is seen that when saturated with liquid gasoline, EPDM elastomeric foam absorbs nearly three times more liquid gasoline than activated charcoal. During engine operations where fresh purging air is drawn into the canister, liquid gasoline and other high molecular weight hydrocarbons are desorbed from the EPDM foam rubber material into vapor and purged back into the engine induction passage. FIG. 2 shows that in 60 minutes, more than half of the liquid gasoline originally absorbed in the EPDM elastomeric foam has been desorbed. Consequently, an EPDM elastomeric foam filter may be used in endless cycles of liquid fuel absorption and desorption. It is an ideal fuel absorbent for evaporative fuel vapor control devices used in a vehicle.

Figure 3:
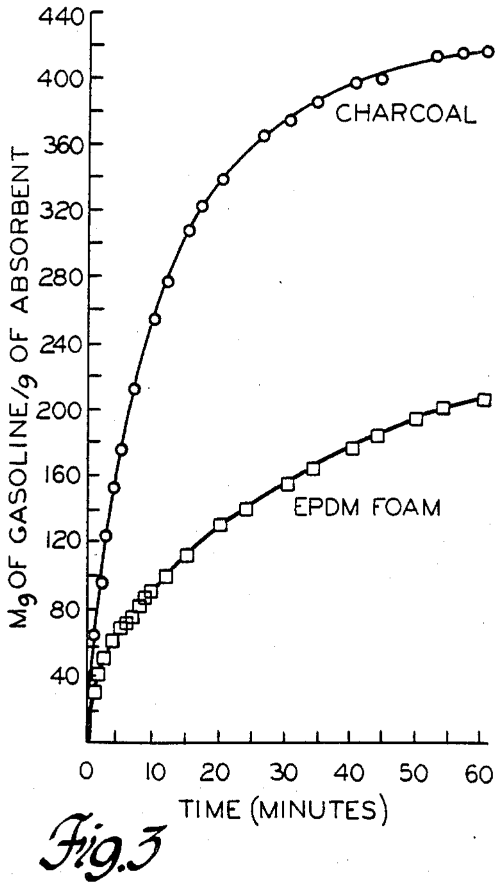
FIG. 3 is a graph showing the absorption of fuel vapor by activated charcoal and by EPDM elastomeric foam.

FIG. 3 is a graph showing absorption curves of gasoline vapor for activated charcoal and for EPDM elastomeric foam. It is seen that while EPDM elastomeric foam is not as effective as activated charcoal in absorbing gasoline vapor, it contributes significantly to the total absorption of gasoline vapor when used in an evaporative fuel vapor control device. Therefore, activated charcoal and EPDM elastomeric foam filters can be used in combination in an evaporative fuel vapor control device to achieve maximum absorption of both gasoline vapors, liquid gasoline and other high molecular weight hydrocarbons.

While my invention has been described in terms of a preferred embodiment thereof, it is to be appreciated that those skilled in the art will readily apply these teachings to other possible variations of my invention.

The embodiments of the invention in which an exclusive property or privilege is claimed are defined as follows:

1. In a carbon canister of the type used in a vehicle equipped with a fuel reservoir and an internal combustion engine with an induction passage for the purpose of evaporative fuel vapor control, said canister having a housing, a quantity of fuel vapor adsorbing material in said housing, a fuel vapor inlet and outlet means, and an air inlet means, wherein the improvement comprises a filter means of EPDM elastomeric foam positioned in said housing for the adsorption of fuel vapor and condensed liquid fuel from said fuel reservoir and the desorption of the same when fresh atmospheric air is purged through said filter means into the induction passage of said internal combustion engine.

2. A canister for use in a system for controlling loss of fuel vapor from a vehicle having a fuel reservoir and an internal combustion engine with an induction passage, said canister comprising a housing having a cylindrical adsorption chamber defined by a cylindrical side wall and a first and a second oppositely disposed end wall, a quantity of fuel vapor adsorbing material filling said chamber, filter means made of EPDM elastomeric foam adjacent to said adsorbing material, fuel vapor inlet means in said first end wall adapted for connection to said reservoir whereby fuel vapor emitted from said reservoir may be dispersed into said adsorbing material and said foam filter means, air inlet means in said second end wall in fluid communication with said fuel adsorbing material and said foam filter means, fuel vapor outlet means adapted for connection to said induction passage whereby said foam filter means adsorbs fuel vapor and liquid fuel from said fuel reservoir and fuel vapor may be purged from said adsorbing material and said foam filter means into said induction passage by the fresh air intake through said air inlet means.

3. A canister for use in a system for controlling loss of fuel vapor from a vehicle having a fuel reservoir and an internal combustion engine with an induction passage, said canister comprising a housing having a cylindrical adsorption chamber defined by a cylindrical side wall and a first and a second oppositely disposed end wall, said first end wall containing fuel vapor inlet means and fuel vapor outlet means, said second end wall containing an air inlet means, a quantity of fuel vapor adsorbing material filling said chamber, filter means made of fuel adsorbing EPDM elastomeric foam having a density of less than 0.50 gm/cm$^3$ adjacent to said adsorbing material and said air inlet means, fuel vapor inlet means in said first end wall adapted for connection to said reservoir whereby fuel vapor emitted from said reservoir may be dispersed into said adsorbing material and said foam filter means, air inlet means in said second end wall in fluid communication with said adsorbing material and said foam filter means, fuel vapor outlet means adapted for connection to said induction passage whereby said foam filter means assists in the adsorption of fuel vapor and liquid fuel and such fuel vapor and liquid fuel may be purged from said foam filter means to said induction passage by the fresh air intake through said air inlet means.

* * * * *